(12) United States Patent  (10) Patent No.: US 7,585,446 B2
Kanemura  (45) Date of Patent: Sep. 8, 2009

(54) METHOD AND EQUIPMENT FOR PRODUCING POLYMER-FILM

(75) Inventor: Kazuhide Kanemura, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 793 days.

(21) Appl. No.: 10/947,307

(22) Filed: Sep. 23, 2004

(65) Prior Publication Data

US 2005/0062194 A1 Mar. 24, 2005

(30) Foreign Application Priority Data

Sep. 24, 2003 (JP) .............................. 2003-331550

(51) Int. Cl.
   *B28B 5/00* (2006.01)
(52) U.S. Cl. ..................................... 264/216
(58) Field of Classification Search ................. 264/212, 264/216, 175, 298
   See application file for complete search history.

(56) References Cited

U.S. PATENT DOCUMENTS

2002/0050668 A1* 5/2002 Yamazaki et al. ........... 264/556

FOREIGN PATENT DOCUMENTS

JP 06-155494 A 6/1994
JP 10-272637 A 10/1998

* cited by examiner

*Primary Examiner*—Eric Hug
*Assistant Examiner*—Russell J Kemmerle, III
(74) *Attorney, Agent, or Firm*—Birch, Stewart, Kolasch and Birch, LLP

(57) ABSTRACT

A dope is discharged from a casting die toward a belt to form a film-like material above the belt. Thereby a range near the film-like materials is decompressed by first and second decompression chambers. A pipe connecting each decompression chamber to a pressure controller has an inner diameter from 70 mm to 700 mm, and a length of the pipe is at most 30 m. Further the pipe is provided with a first expansion silencer of expansion silencer and a second expansion silencer of resonance silencer, and a sectional dimension ratio of the first expansion silencer to the pipe is from 5 to 500. Thus a pressure fluctuation in the second decompression chamber and the pipe is reduced and the film-like material becomes uniform. Thus the obtained film has no thickness unevenness, and used for producing a polarizing filter excellent in optical properties and a liquid crystal display.

8 Claims, 9 Drawing Sheets

METHOD AND EQUIPMENT FOR PRODUCING POLYMER-FILM

This Nonprovisional application claims priority under 35 U.S.C. §119(a) on Patent Application No(s). 2003-331550 filed in Japan on Sep. 24,2003, the entire contents of which are hereby incorporated by reference.

BACKGROUND OF THE INVENTION

1. Field of the Invention

The present invention relates to a method and an equipment for producing a film, especially a method and an equipment for producing a film for an optical use.

2. Description Related to the Prior Art

In an optoelectronics field are used many polymer films which are produced in a solution casting method. The polymer film produced in the solution casting method is more excellent in an optical isotropy and a uniform thickness, and contains foreign materials less than a film produced in a melt-extrusion method. Therefore the polymer film is used, for example, as a protective film for a polarizing filter, a retardation film, a transparent conductive film, and the like. Especially among such polymer films, a cellulose acylate film is widely used since having transparency and adequate moisture permeability, high mechanical strength, and low dependency of a size stability on humidity and temperature. In the solution casting method, the polymers (such as cellulose acylate and the like) and the additives are dissolved to a solvent such that a dope may be obtained. Then the dope is cast from a die on a support, and peeled from the support when having a self-supporting property. The peeled film is dried in a drying process to obtain a film. The support is a metallic drum or a belt that is continuously moved in a cycle.

Further, recently, the above optoelectronics field shows noticeable progress, and it is required that the polymer film as one material thereof may have high function and multifunction. Accordingly, the polymer film must become thinner. In the solution casting method, a decompression chamber (corresponding to an aspiration chamber of the present invention) is provided near the dope between the die and the support so as to decompress in an area from a rear of the dope. Thus the decompression is made in an upstream side of the support from the cast dope between the die and the support, such that the thickness of the polymer film may become thinner. Further, also in the melt extrusion method, in order to make the film thinner, the film is produced from the molten polymer which is extruded from the die by aspirating the air in the same manner.

However, when the film becomes thinner, the production thereof becomes harder, and especially it becomes extremely harder to have a uniform thickness. For example, when the decompression is made in a rear side of the dope with the decompression chamber, the film thickness fluctuates in accordance with the pressure change in the decompression chamber. In this case, the distribution of the film thickness usually often shows cyclical pattern in lengthwise direction. The nonuniformity of the film thickness is a deadly defect of the product when the film thickness is at most 100 μm. Further, in order to decrease the fluctuation of the film thickness, the dope is diluted, or the drying speed of the film peeled from the support is made lower. Thus the film thickness is sometimes made uniform. However, the nonuniformity remains although reduced. Further, in the both cases, since the drying time becomes longer, the productivity becomes lower and the production cost becomes higher.

Accordingly, several proposal has been made about the method of producing the film from the dope with the decompression chamber, to prevent the generation of the nonuniformity of the film thickness. For example, in Japanese Patent Laid-open Publication No. 6-155494, an air inlet is formed at a position of at most 0.3 times of a width from each side edge of the decompression chamber. Through the air inlet, the air near the rear of the dope between the die and the support is aspirated into the decompression chamber under reduced pressure. In this method, the structure of the decompression chamber is the most adequate to reduce the wave-like nonuniformity of the film thickness.

Further, Japanese Patent Laid-Open Publication No. 10-272637 discloses a method of producing a film from a dope with at least two aspirating means. The dope is discharged from a slit of the die onto a surface of the moving support, and a casting film formed from the dope on the support is conveyed. In this method of producing the film, at least two aspirating means are used for preventing the movement of the applied point of the cast dope onto the substrate so as to increase the tightness of the casting film to the support.

However, in the method of the publication No. 6-155494, although the generation of defects of the film surface is reduced, there are no effects for reducing the thickness nonuniformity which is cyclically generated in the lengthwise direction. Further, in the publication No. 10-272637, the decompression chamber is disposed only in upstream from the applying point. In this structure, the movement of the applying point is not only reduced, but the fluctuation of pressure in the decompression chamber and the pipes thereto also enlarge the movement of the applying point.

SUMMARY OF THE INVENTION

An object of the present invention is to provide a method of producing a polymer film, in which it is restrained that the wrinkles cyclically generated in a lengthwise direction of a polymer film.

In order to achieve the object and the other object, in a method of producing a film of the present invention, a molten polymer or a dope containing a polymer is discharged as a film-like material toward a support from a die, and the film-like material is dried to be the film. A decompression is made near the film-like material above the support with a decompression chamber in which an inner pressure is controlled by a pressure controller. When a thickness of the dried film is t and a predetermined value of the inner pressure in the decompression chamber is $P_0$ (unit; Pa), a variation of the inner pressure in the decompression chamber satisfies following formulae:

$$3 \leq |Pv| \leq 1.5|K|, K=(t \times |P_0|)^{1/2}/100.$$

In a preferable embodiment of a method of producing a film from a polymer of the present invention, the polymer is applied onto a running support with use of a die and peeled as the film from the support, and the film is dried or cooled. The polymer is discharged from the die in a situation which the polymer is melt or dissolved to a solvent. The decompressing is made near the discharged polymer by a decompressing apparatus. a vibration occurring during a drive of the decompressing apparatus is damped by a silencer of the decompressing apparatus, such that a pressure near the polymer may be suppressed in a predetermined fluctuation range during the decompression.

A film production equipment for producing a polymer film of the present invention includes a support, a die for casting onto the running support a polymer in a situation which the polymer is dissolved to a solvent or melt. Further the film production equipment has a drying apparatus or a cooling apparatus for drying or cooling the polymer so as to form the polymer film, and a decompressing apparatus for decompressing near a polymer outlet of the die. The decompressing apparatus includes a decompression chamber, a pressure regulating section for regulating an inner pressure of the decompression chamber, and a pipe for connecting the decompression chamber and the pressure controller. A number of bend portions from the pressure regulating section to the decompression chamber is at most 15.

In another preferable embodiment, a film production equipment has a support and a die for casting onto the running support a polymer in a situation which the polymer is dissolved to a solvent or a melt. The film production equipment is provided with a drying apparatus or a cooling apparatus for drying or cooling the polymer so as to form the polymer film. The film production equipment includes further a decompressing apparatus having a decompression chamber disposed near an polymer outlet of the die, a pressure regulating section for regulating an inner pressure of the decompression chamber, and a pipe for connecting the decompression chamber and the pressure regulating section. The film production equipment has a vibration damping device provided for the pipe for damping a vibration causing a change of an inner pressure of the decompression chamber.

According to the method of the present invention, the air-pressure fluctuation in the decompression chamber and the pipe to the decompression chamber can be reduced, and therefore the pressure change in the decompression chamber becomes smaller. Accordingly, the vibration of the discharged dope (also called a bead) from the die above the support is suppressed. Therefore, the obtained film is adequate and has no thickness unevenness. Further, when the polymer is cellulose acylate in the obtained film, a polarizing filter having excellent optical properties and the liquid crystal display.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
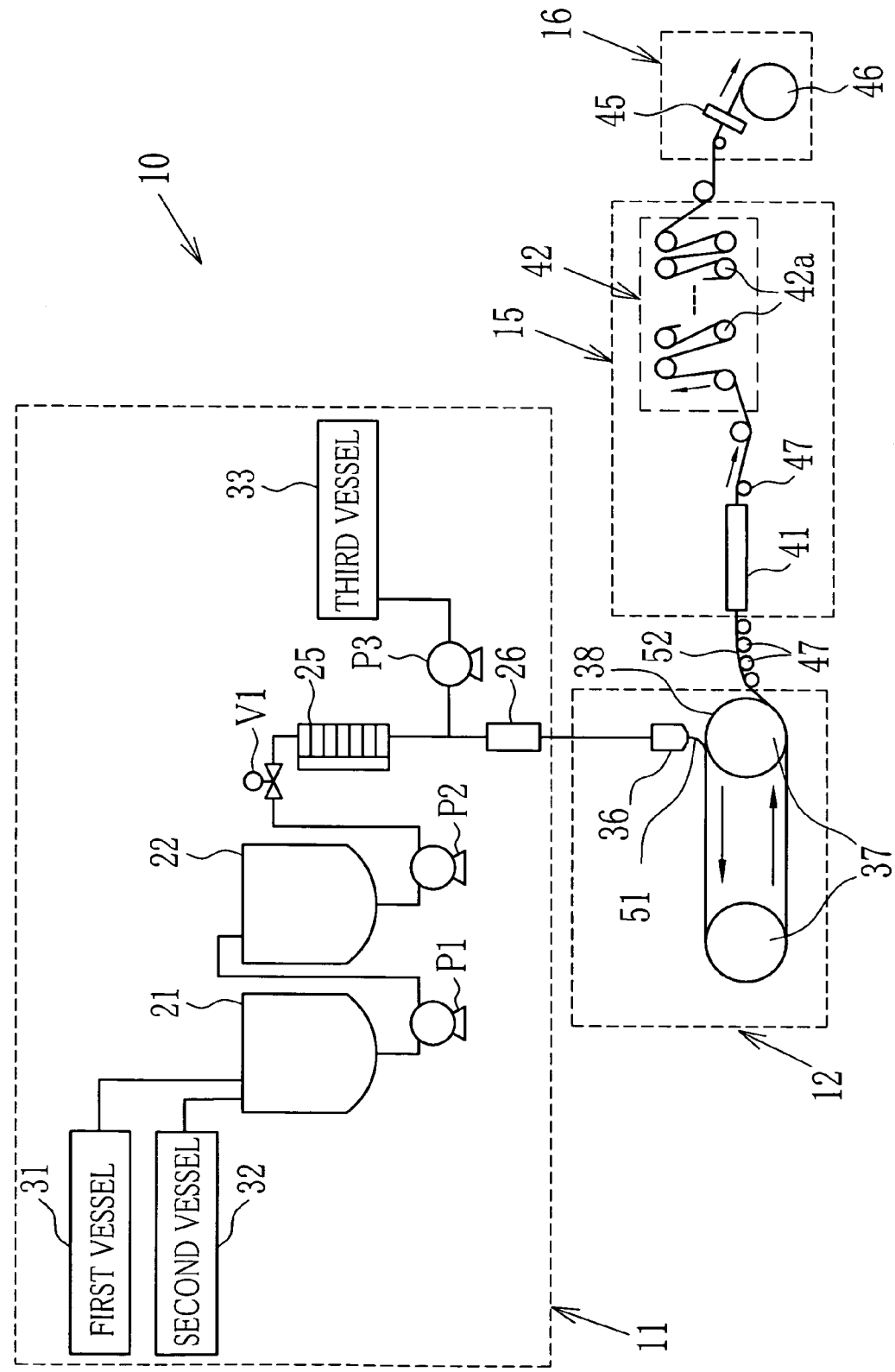
FIG. 1 is a schematic diagram of a film production equipment as an embodiment of the present invention.

FIG. 1 is a schematic diagram of a film production equipment for producing a film from a solution as an embodiment of the present invention. Note that the present invention is not restricted in the equipment in FIG. 1. A film production equipment 10 includes a dope preparing apparatus 11, a casting apparatus 12, a drying apparatus 15, and a winding apparatus 16.

The dope preparing apparatus 11 has a stirring tank 21, a stock tank 22, a filtering device 25, a static mixer 26, first-third pumps P1-P3 and a flow rate adjusting valve V1. First-third sources 31-33 are connected to the stirring tank 21 of the dope preparing apparatus 11.

The casting apparatus 12 has a casting die 36, a back-up roller 37 and a belt 38. An aspiration chamber (not shown) is provided near the casting die 36, and the explanation therefor is made in detail later. Further, the drying apparatus 15 has a tenter device 41, a roller dryer 42 and a winding device 16 including a cutter 45 and a winder 46. Note that the film production equipment 10 is adequately provided with rollers 47 when it is necessary, and the rollers 47 support or transport a polymer film 52. In FIG. 1, only parts of used rollers are shown for symplifying this figure.

The polymer as a main content of the film 52 and a liquid as a solvent of a dope 51 are respectively fed through feed paths from the first and second sources 31, 32 to the stirring tank 21. Note that the mixture may be fed to the stirring tank 21 after mixing the materials (the polymer, the solvent and the like) in another source. Further, the other solid contents than the polymer may be added to the mixture. In necessary, additives, such as UV-absorbing agent, particles and the like, are fed from the third source adequately. It is to be noted that the timing for adding the additives is not restricted, and may be added, for example, to the stirring tank 21. The polymer and the solvent which are respectively fed from the first and second sources 31,32 to the stirring tank 21 are mixed in the stirring tank 21 and stirred for a predetermined time. Then the stirred mixture is fed to the stock tank 22 by the first pump P1. In the stock tank 22, the mixture is stationary disposed to make a defoaming. Thus the amount of the foam in the dope 51 is made smaller, and it is prevented that the foams remain in the film 52.

The mixture is fed to the filtering device 25 by the second pump P2, and undissolved materials and foreign materials (such as dusts and the like) are removed from the mixture. The flow rate of the mixture from the stock tank 22 to the filtering device 25 is controlled with the valve V1 in consideration with a filtration pressure of the filtering device 25 and a film producing speed. Note that the feeding of the dope may be made with control thereof by a metering pump which is used instead of the second pump P2 and the valve V1. The additives from the third source 33 and the mixture are mixed inline with the static mixer 26, and fed as the dope 51 to the casting die 36.

The dope 51 is cast from the casting die 36 onto the continuously moving belt 38 supported by the back-up roller 37. The back-up roller 37 is provided with a drive controlling device (not shown) for controlling the rotation speed of the back-up roller 37, such that the belt 38 may be conveyed at a predetermined speed. The dope 51 forms a casting film on the belt 38 to have a self-supporting properties with being transferred. Note that a drum may be used as the support instead of the belt 38. However, the illustration thereof is omitted in the figure of this embodiment.

The casting film having the self-supporting properties is peeled as the film 52 from the belt 38 by a first one of the rollers 47, and thereafter transferred to the tenter device 41. The tenter device 41 transfers the film 52 with stretching and regulating the width of the film 52, and drying the film 52. In the tenter device 41, plural tenter clips moves on a tenter orbit (not shown) with supporting both side edges. Instead of the tenter clip 29, pin clips may be used. The tenter clips are automatically controlled to open and close by the controller (not shown). Thereby the support and the release of the film 52 is regulated by opening and closing. The tenter clip supporting the film 52 moves in the tenter device 41 to a predetermined release point near an exit, at which the clip is automatically controlled so as to release the support of the film 52.

The film 52 in the tenter device 41 is transported to a roller dryer 42 as a next process by the rollers 47 for supporting or transporting. In the roller dryer 42, the film 52 is dried enough with being supported or transported by plural rollers 42a. Both side edges of film 52 after dried enough are cut off by the cutter 45, and thereafter the film 52 is wound as a product by the winder 46.

Figure 2:
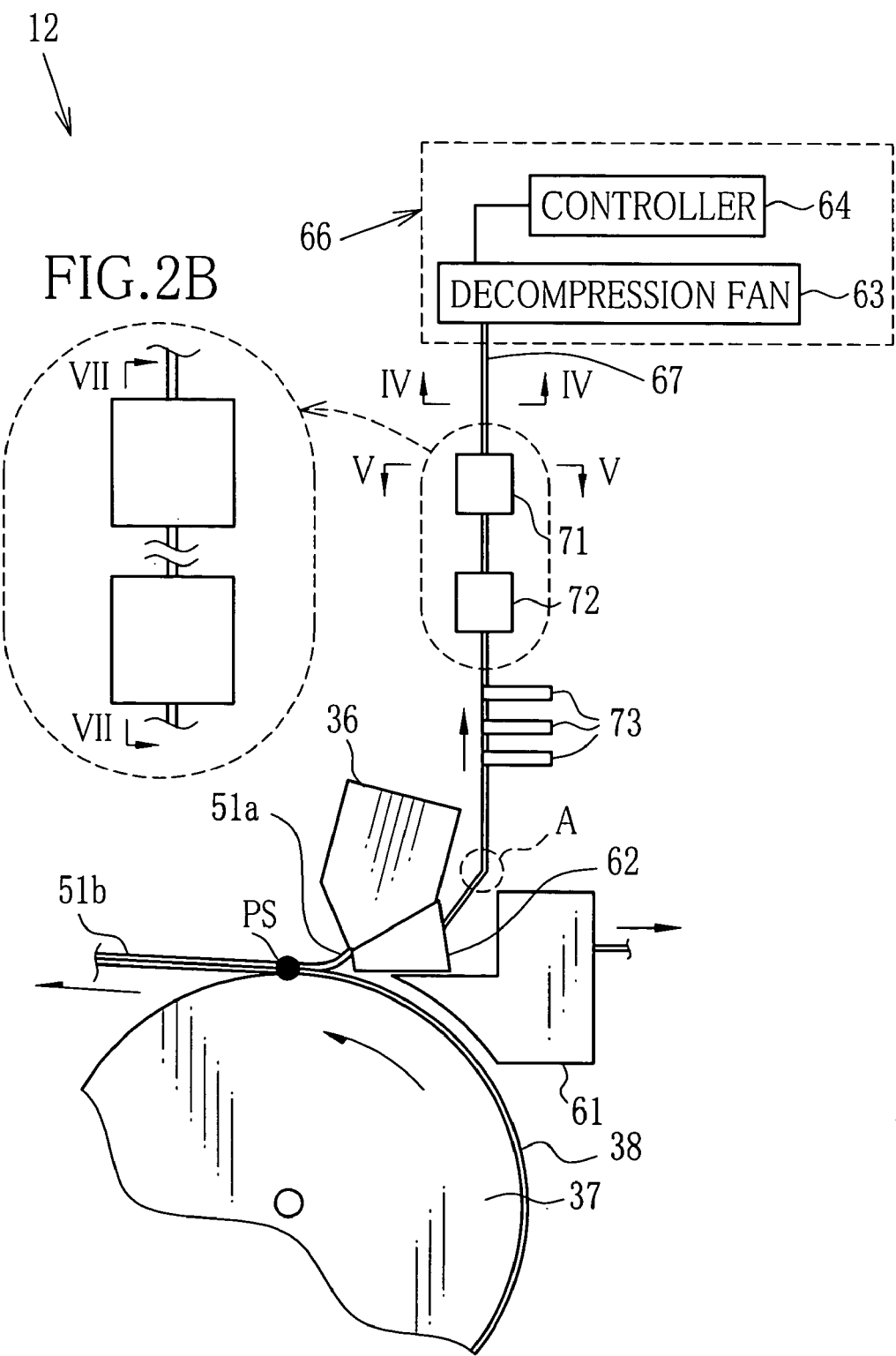
FIG. 2A is a schematic diagram of a casting apparatus in the film production equipment.
FIG. 2B is a partial view of the casting apparatus.
Figure 3:
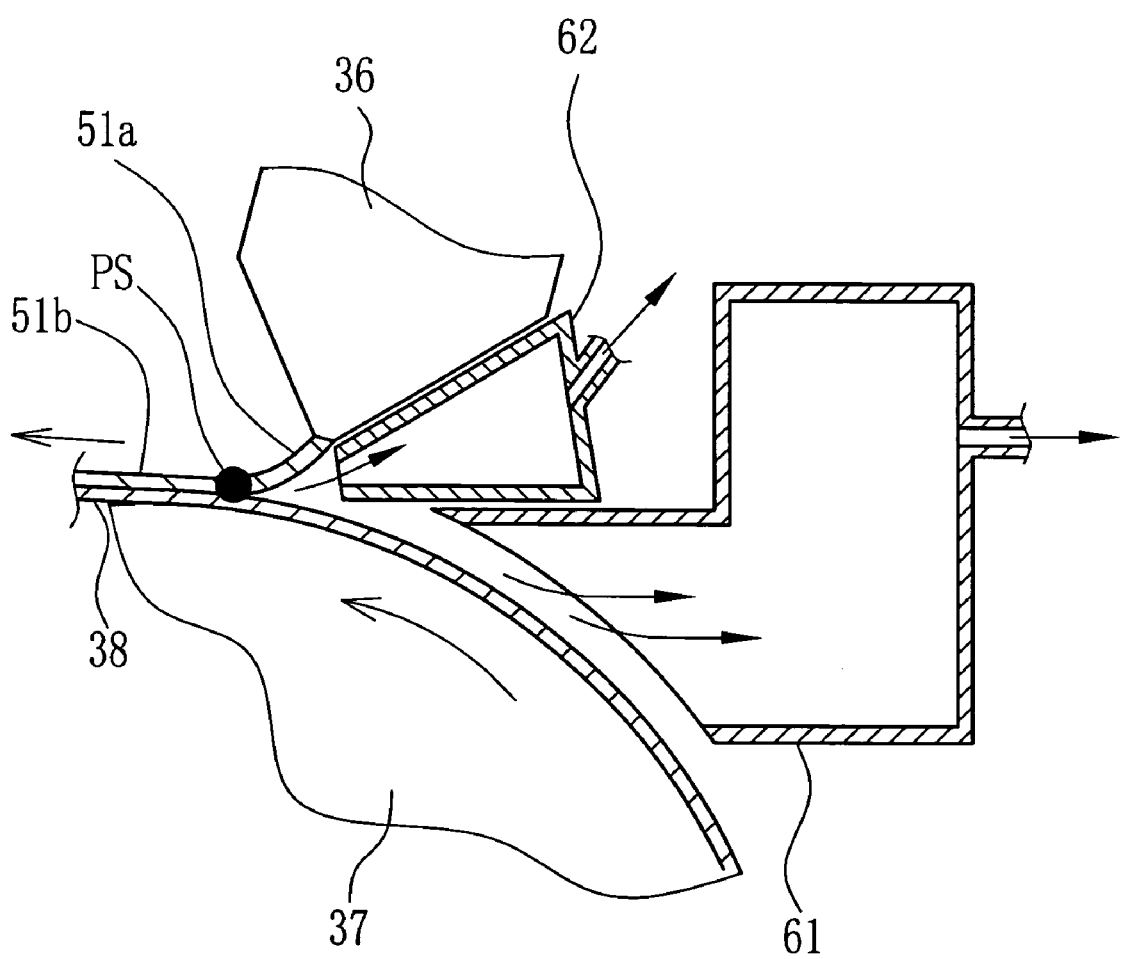
FIG. 3 is an explanatory view of aspirating an air into first and second decompression chambers in the casting apparatus.

A casting process with use of the casting apparatus 12 will be described with reference to FIGS. 2&3. FIG. 2A is a schematic diagram of the casting apparatus 12, and FIG. 2B is an exploded partial view of the casting apparatus 12. FIG. 3 is a partial sectional view of the casting die 36 and the belt 38. In the following explanation, a position at which the dope 51 discharged from the casting die 36 lands on the belt 38 is called a cast-starting point PS. Further the casting dope between a lip of the casting die 36 and the cast-starting point PS is called a discharged dope 51a. The discharged dope lands the belt 38 to form a casting film 51b thereon. As shown in FIG. 2, in upstream from the casting die 36 in the conveying direction of the belt 38, there are first and second decompression chambers 61,62. The first decompression chamber 61 is disposed in upstream from and larger than the second decompression chamber 62. The second decompression chamber 62 is closed to a rear (or an exposed surface) of the discharged dope 51a from the casting die 36 to the belt 38. Further, the first decompression chamber 61 has an air aspiration section whose top is disposed between the second decompression chamber 62 and the belt 38 and near a bottom of the second decompression chamber 62.

To the second decompression chamber 62 is connected a decompression regulating section fan 66 which is constructed of a decompressing fan 63 and a controller 64 for controlling a rotation number of the decompressing fan 63. The rotation number of the decompressing fan 63 is controlled so as to regulate the pressure near a rear face of the discharged dope 51a by the decompressing chamber 62. Note that a pipe 67 connects the second decompression chamber 62 and the decompressing fan 63 and an air is fed therein. The pipe 67 is provided with first and second expansion silencers 71, 72 and a resonance silencer (or side branch resonator) 73 which is nearer to the second decompressing fan 63. Note that a decompressing fan and a controller is connected to the first decompression chamber 61. However, they are omitted in this figure.

An air in the first decompression chamber 61 is aspirated by the decompressing fan 63, and the pressure reduces. An air in the second decompression chamber 62 is aspirated by the decompressing fan 63, and the pressure reduces. The decompression regulating section 66 regulates a degree of pressure reduction in the second decompression chamber 62. Thus the decompression over the rear of the discharged dope 51a is effectively made, and the casting film 51b is formed on the belt 38. Note that the present invention is not restricted in the formation, number and the like of the above decompression chamber.

When the casting is made, the degree of pressure reduction in the second decompression chamber 62 is usually determined in accordance with at least sort and properties of the dope 51, a casting speed, and an objected film thickness t($\mu$m). However, the inner pressure in the second decompression chamber 62 varies in the performance of the casting, and the pressure fluctuation occurs from the vibrations generated in the casting apparatus 12. The inventor found in the research of the present invention that a thickness accuracy necessary for obtaining excellent optical properties of the optical film and an allowable range of the above pressure fluctuation can be set depending on a film thickness.

As the vibration which causes the pressure fluctuation, there are a feeding vibration induced by feeding the dope 51 to the casting die 36 with a pump or the like, a rotation vibration induced by rotating the back-up roller 37, a driving vibration induced by driving the decompressing fan 63 and the like. These vibrations cause the swaying of the discharged dope 51a, and the swaying induces the movement of the cast-starting position PS. Further since the vibrations causes also the change of spaces between the second decompression chamber 62 and members close thereto or between the second decompression chamber 62 and other devices, the pressure of the inside air varies. Such inside pressure fluctuation includes a periodic fluctuation in pressure, as described in the followings. Note that the spaces are formed, for example, between the second decompression chamber 62 and the belt 38, the casting die 36 or the discharged dope 51a. Further, in the present invention, the discharged dope 51a and the casting film 51b are in an atmosphere of inert gas such as nitrogen. Accordingly, the pressure fluctuation and periodic fluctuation in the second decompressing chamber 62 are those of the inert gas.

The predetermined pressure value in the second decompression chamber 62 is $P_0$, and the pressure fluctuation value between the predetermined value $P_0$ and a measured value Pm of the pressure in the casting is Pv (unit: Pa). That |Pv| (an absolute value of the difference value Pv) is small means that the measured value Pm is near the predetermined value $P_0$, and that |Pv| is constant means that the pressure does not vary. In the present invention, the pressure fluctuation Pv satisfies the following formula (1). It is to be noted in the formula (1) that t($\mu$m) is a thickness of the film 52 after the dry.

$$|Pv| \leq 1.5|K| (K=(t \times |P_0|)^{1/2}/100) \tag{1}$$

According to Formula (1), the value of the pressure fluctuation Pv to be decreased adequately for the optical use is determined depending on the film thickness t($\mu$m). In the prior art, the film thickness is actually measured after the roller dryer 42, and the conditions in the casting process are controlled on the basis of the measured data. Therefore the loss of the materials is too large, until the conditions become stabilized. However, in the present invention, the allowable range of the pressure fluctuation in the casting process is determined in accordance with the film thickness t of the produced film 52, and the pressure fluctuation is regulated so as to be in the predetermined allowable range. Therefore the film which has no thickness unevenness and is excellent in the optical properties can be produced effectively, and the loss of material until the stabilization of the conditions is reduced.

Further, in the present invention, since the pipe 67 is connected to the second decompression chamber 62, the inner pressure of the pipe 67 is the same as that of the second decompression chamber 62. Accordingly, the pressure fluctuation of the inner pressure in the pipe 67 is regulated so as to have the same condition as that of the second decompression chamber 62. Note that the measuring method of the pressure fluctuation is explained later.

When the absolute value |Pv| is larger than 1.5|K|, the swaying of the discharged dope 51a is too large, and not adequate since the film has the thickness unevenness. The absolute value |Pv| is particularly preferably at most 0.5×|K|, and especially at most 0.2×|K|. That is, the absolute value |Pv| is the most especially zero. But it is impossible, so when it is nearer to zero, it is preferable moreover.

A method of controlling the absolute value |Pv| will be described. In order to control the absolute value Pv less than 1.5|K|, it is preferable that the inner diameter of the pipe 67 is from 70 mm to 700 mm and the length is at most 30 m while the length of the pipe 67 is the length between the second decompression chamber 62 and the decompressing fan 63. Further the smaller number of bend portion of the pipe 67 in an area A is preferable to the present invention. The number of the bend portion is preferably at most 15.

An preferable range of an inner diameter of the pipe 67 changes depending on the size of the second decompression chamber 62 and the predetermined value $P_0$. But the range is effective in the present invention if the degree of pressure reduction (from the atmospheric pressure) is from −10 Pa to −1500 Pa for producing the film whose width is about from 1000 to 2000 mm. When the inner diameter of the pipe 67 is smaller than 70 mm, the diameter becomes too small for the air flow of the same flow rate. Accordingly, the wind velocity becomes higher, and thus the vibration often occurs in the pipe 67. Further, when the inner diameter is larger than 700 mm, the design of the pipe is not actually made in point of the scale. Further the absolute value |Pv| of the pressure fluctuation is often larger than 1.5|K|, and the precise control cannot be made to the small pressure fluctuation. The inner diameter of the pipe 67 is from 100 mm to 500 mm.

Further, when the length of the pipe 67 is at most 30 m, the effect for suppressing occurrence of the vibration becomes large, the pressure regulation in the second decompression chamber 62 and the pipe 67 can be made fast and finely. When the length of the pipe 67 is more than 30 m, a contact area of the pipe 67 to a circumstance becomes larger, and therefore the disturbance has more influences on the work of the pipe 67 and the casting film. Thus the film has often the nonuniform thickness. As the disturbance, there are for example, a vibration (including noise) generated by driving devices (not shown) provided in or around the casting apparatus 12. Further, the drive conditions of the decompressing fan 63 is controlled by the controller 66 such that the inner pressure in the second decompression chamber 62 may be the predetermined value. When the length of the pipe 67 is larger than 30 m, the time for the control of the inner pressure to the predetermined value becomes longer. The length of the pipe 67 is preferably at most 15 m.

In the present invention, the number of the bend portions A is preferably at most 15 such that the pressure fluctuation in the second decompression chamber 62 and the pipe L2 may be effectively surpressed. The method is that the air more disorderly flows in the bend portions A than in the linear portion and that the rate of occurrence of the periodic fluctuation becomes higher when the number of the bend portion becomes larger. Accordingly, when the number of the bend portions A is smaller, the reduction of the occurrence of the fluctuation is more effective. The number is preferably at most 10, particularly at most 5, and especially at most 3.

Further, in this embodiment, first and second expansion silencers 71, 72 and a resonance silencer 73 are vibration suppressing devices for improving the effect of suppressing the periodic fluctuation and the other pressure fluctuation. Thus the vibration of the pipe 67 is damped, and periodic fluctuation in pressure to be transmitted to the discharged dope 51a is reduced. When the inner pressure value of the second decompressing chamber 62 varies, the position of the cast-starting point Ps shifts. In this case, even though the pressure fluctuation Pv is any values, the pressure fluctuation is effectively reduced by the vibration suppressing devices which is provided for the pipe 67. As the vibration suppressing devices, the silencers already known are preferable in view of the easiness of the installment, the easiness of procurement, and a cost effectiveness. Note that the vibration suppressing devices includes not only the apparatuses which exactly reducing the generated vibrations but also the apparatus which absorbs the vibration or counteracts the vibration by the wave reflection and the like. In the following explanation of the present invention, the function, namely the operation of the vibration suppressing device, is called the damping or the reduction.

Also when the number of the vibration suppressing device is one, the present invention is effective. However, the number is two or more, the effect of the present invention becomes higher.

Further, only expansion silencers or only the resonance silencers may be used as the plural silencers. It is preferable to provide at least one, and especially at least three expansion silencers on the pipe 67 whose length is at most 30 m. Note that there are differences between the expansion silencer and the resonance silencer as described below, and the operations are different between them. Therefore these two types are simultaneously used, or selected on the measured data of the pressure fluctuation. Further when the types of the used two silencers are respective two types as in this embodiment, the positional relation between the types is not restricted. For example, even if the positions of the first and second expansion silencers 71, 72 are oppositely arranged, or even if the resonance silencer 73 is disposed between the first and second expansion silencers 71, 72, the effect of the present invention is the same.

There are many products as the expansion silencers and the resonance silencers in the market. The expansion silencers are silencers represented as mufflers of cars, and have a structure in which the sectional area of a pipe changes. The expansion silencers are effective in wide frequency range. Further, the resonance silencer has a resonance structure of vibration therein, and are effective in specific frequency values.

Both of the above described two silencers are one of silencers called reactive type. In the silencer of the reactive type, variation of acoustic impedance in the pipe is used such that the sound wave is reflected to a side of a source thereof. Also a silencer including the structures of both expansion silencer and resonance silencer is sold in the market and preferably used in the present invention. Further, there are not only a reactive type but also absorptive type of the silencer. In the absorptive type, acoustic materials having the effect of absorbing sonic energies are used. Also when the absorptive type is used in the present invention, the predetermined effect is obtained. Note that the absorptive type has a demerit that the effect on the low frequency range is smaller than the reactive type. The type of the silencer is not restricted especially in the present invention. However, the expansion silencer and the resonance silencer are especially preferable in view of easiness of procurement and effects depending on the frequency range of vibrations to be absorbed.

Figure 4:
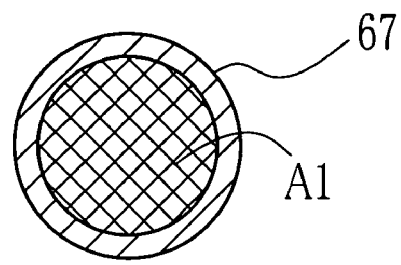
FIG. 4 is a sectional view of a pipe connected to the decompression chamber along a line IV-IV in FIG. 2A.
Figure 5:
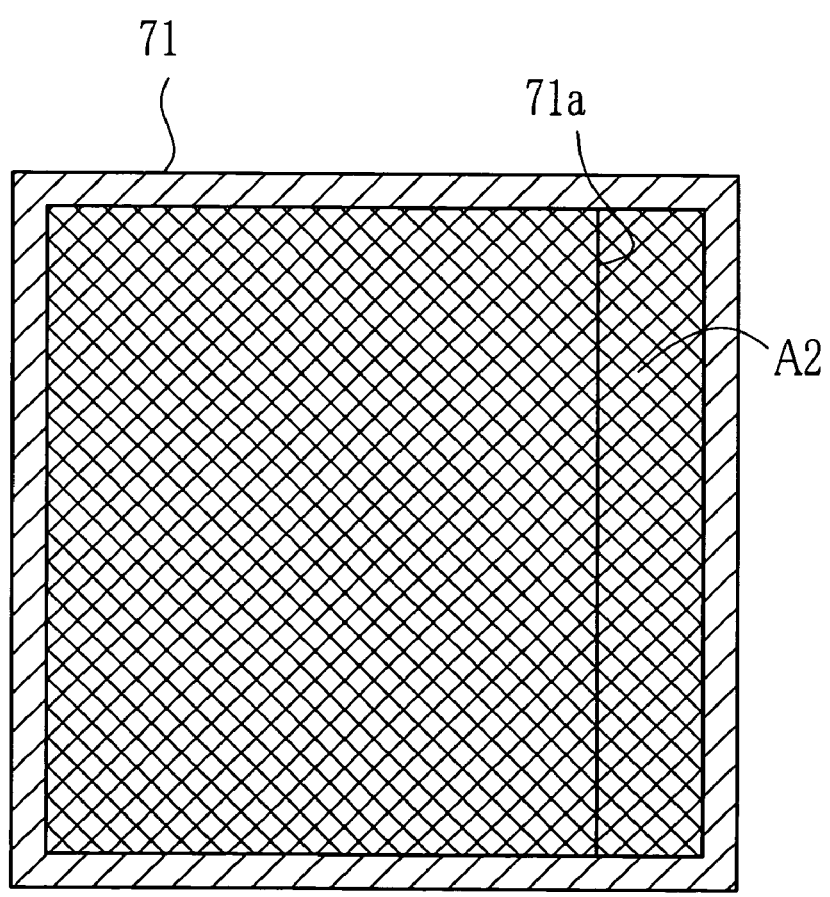
FIG. 5 is a sectional view of the firs expansion silencer a line V-V in FIG. 2A.

FIG. 4 is a sectional view of the pipe 67 along a line IV-IV in FIG. 2, and FIG. 5 is a sectional view of the first expansion silencer 71 along a line V-V. As the sections of the second expansion silencer 72 in the same directions are the same as those of the first expansion silencer 71, the explanations and illustration of the sections of the second expansion silencer 72 are omitted. In FIG. 4, an area Al illustrated by cross-hatchings in of the pipe 67 has a dimension S1. In FIG. 5, an area A1 illustrated by cross-hatchings in the first expansion silencer 71 has a dimension S2 as a dimension of a sectional area in a lengthwise direction of the first expansion silencer 71. As described below, a length of the first expansion silencer 71 can be larger and shorter in the lengthwise direction to change the dimension S2. Therefore the dimension S2 is an optional one of the changeable values. As shown in FIG. 5, a first sectioning member 71c is provided in the first expansion silencer 71, which will be explained later in detail. In this embodiment, a value S2/S1, or a quotient of the dimension S2 the first expansion silencer 71 to the dimension S1 of the pipe 67, is preferably from 5 to 500, and especially from 20 to 300. When the value S2/S1 is from 5 to 500, the effects of damping the periodic fluctuations in pressure (such as a reduction of collision-induced vibration, a sound absorption, a phase difference damping, a distance attenuation or a distance delay and the like) become larger. If the value S2/S1 is larger than 500, the device becomes too large. If the value S2/S1 is less than 5, The effects of damping the periodic fluctuation in pressure become smaller.

Otherwise, when the resonance silencer is used, it is preferably to select the silencer in which a length in the lengthwise direction of the silencer is adjustable. In this case, when the length is adjusted in accordance with sorts of periodic fluctuation in pressure, the frequency resolution becomes harder. The number of the used resonance silencer in which the length of the pipe 67 is at least 30 m is preferably at least 1, and especially at least 3.

In the above method, the many periodic fluctuations are reduced to regulate the absolute value |Pv| in the first decompression chamber 61 (see FIGS. 2&3) at most 1.5|K|. However, when the pressure is measured, the periodic fluctuation in pressure is sometimes recognized as described above. Then, in this embodiment, the cyclical vibration of the pressure is analyzed. Concretely, the frequency resolution of measured data of the inner pressure which periodically varies is made by a FFT. The obtained data is a power spectrum data by FFT. In this method, although the measured data of the inner pressure is originally represented in a graph in which a vertical axis is the inner pressure and the lateral axis is the time, the power spectrum data by the FFT is represented in a graph in which the vertical axis is the inner pressure but the lateral axis is the frequency (Hz). Note that the FFT of the data of the inner pressure may be made. Further the FFT of the data of the pressure fluctuation Pv or the absolute value |Pv| thereof may be made. In this embodiment, an example in which the power spectrum data of the absolute value |Pv| is used will be explained. In the data, there are peaks at specific frequencies.

Figure 6A:
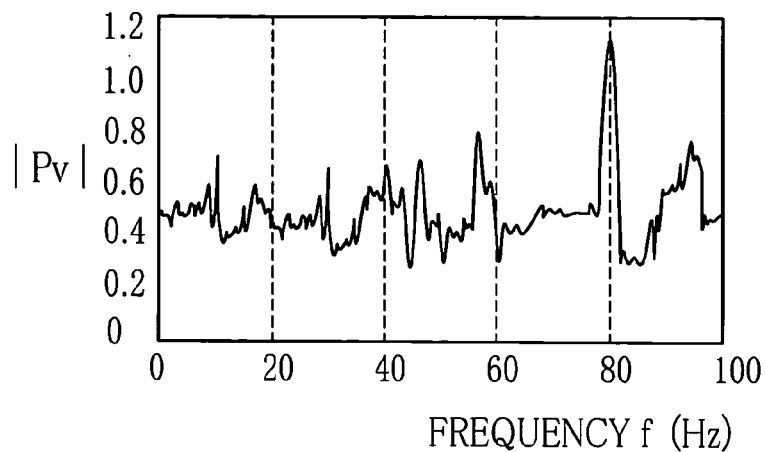
FIG. 6A is a graph of a relation between a frequency and a |Pv| value in an air pressure fluctuation in a prior art.
Figure 6B:
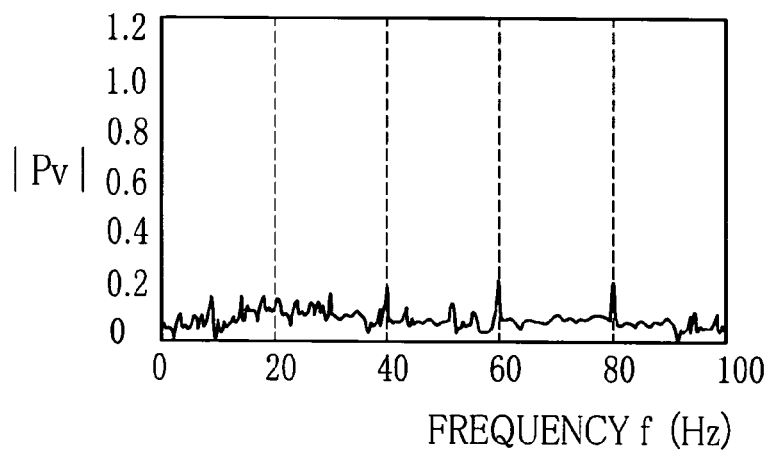
FIG. 6B-6C are graphs of relations between a frequency and a |Pv| value in an air pressure fluctuation in the present invention.
Figure 6C:
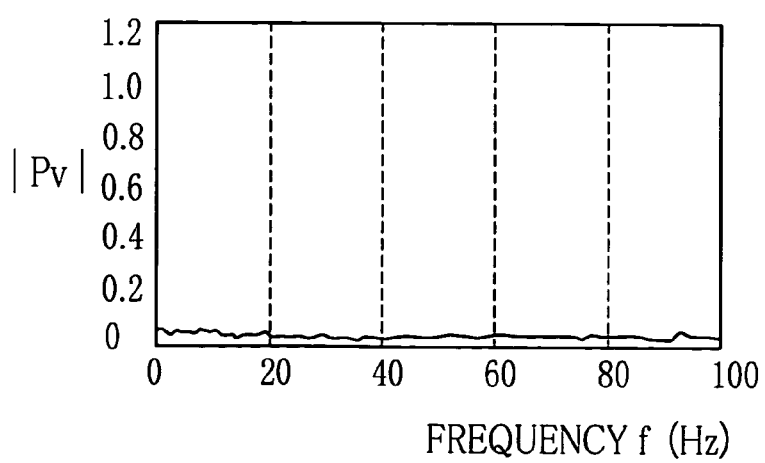

In FIGS. 6A-6C, the vertical axis is the absolute value |Pv| and the lateral axis is the frequency (unit: Hz). FIG. 6A is a data of the apparatus and the method of producing the film in the prior art. FIG. 6B is the data of the above described method of the present invention. FIG. 6C is the data of a method described later. In any data, the condition, $t \leq 80$ μm, is satisfied.

As shown in FIG. 6A, in the prior art, the number of the peaks becomes smaller, and the absolute value |Pv| is large in all over the frequency range. However, the value |Pv| is smaller in all over the frequency range in FIG. 6B in which the value |Pv| is regulated to be at most 1.5|K|. Accordingly, in the above described method of the present invention, the thickness accuracy is adjusted to be adequate, and therefore the film have the good optical properties. However, as shown in FIG. 6B, there are some peaks in data of the value |Pv|, for example at 80 Hz, 60 Hz, 40 Hz, 30 Hz, although the intensity of the peaks is not so high.

In order to decrease the intensity of the each peak, an embodiment of the method which will be described below is performed and the data of FIG. 6C is obtained. In FIG. 6C, the peaks recognized in FIG. 6B become smaller and hardly recognized. The value |Pv| becomes lower in all over the frequency range. In the method of FIG. 6C, the periodic fluctuation in pressure recognized in data of FIG. 6B is reduced. In followings, the embodiment of the method in FIG. 6C will be explained in detail.

Figure 7:
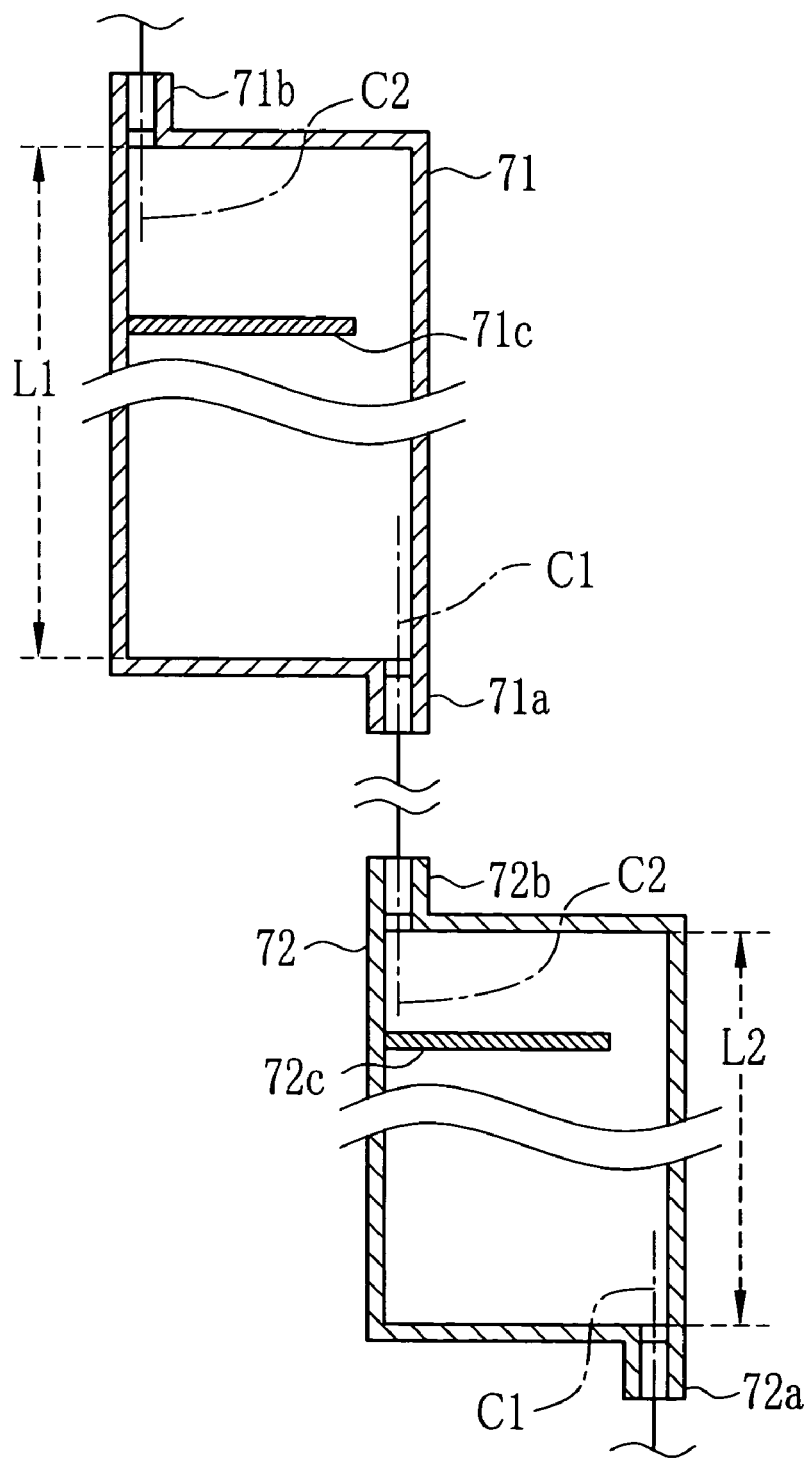
FIG. 7 is a sectional view of an embodiment of the expansion silencers in the film production equipment a line VII-VII in FIG. 2B.
Figure 8:
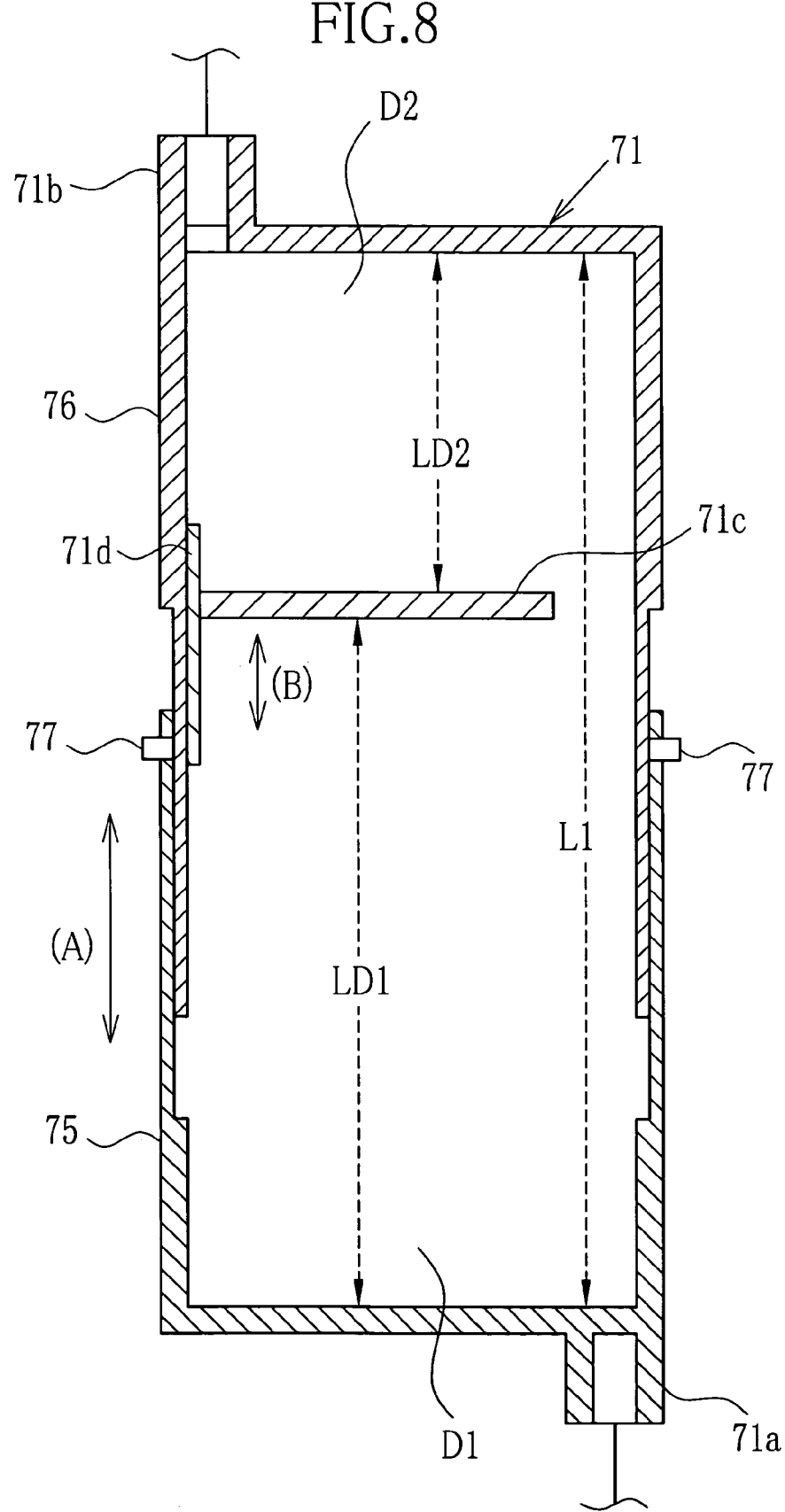
FIG. 8-11 are sectional views of other embodiments of the expansion silencers.

In this method, the peaks of the value |Pv|, whose number is not so large but appear at certain frequencies, are selectively made smaller. In order to achieve this purpose, the expansion silencers are used in the following conditions. FIG. 7 is a sectional view along a line VII-VII in FIG. 2, and FIG. 8 is a sectional view of the first expansion silencer 71. The respective lengths L1, L2 of the first and second expansion silencers 71, 72 are sometimes set to be different. However, the structures of the first and second expansion silencers 71, 72 are almost the same. As shown in FIG. 7, the first and second expansion silencers 71, 72 respectively has inlets 71a, 72a for aspirating air from the second decompression chamber 62, outlets 71b, 72b for discharging air to outside, and sectioning members 71c, 72c. In the first expansion silencer 71, the inlet 71a and the outlet 71b are diagonally positioned in section in the lengthwise direction such that centerlines C1, C2 (imaginary lines extending through the respective centers of the inlet and outlet 71a, 71b) may not enter into another. Namely, the centerline C1 does not enter into the outlet 71b, and the centerline C2 does not enter into the inlet 71a. The structure is the same in the second expansion silencer 72.

When the positions of the inlets 71a, 72a and the outlets 71b, 72b are determined as described above, the periodic fluctuation in pressure is reduced at high probability by the first and second expansion silencers 71, 72. If the combination of the inlet and outlet 71a&71b or 72a&72b is disposed on one line, the vibration from the inlet 71a, 72a into the silencer directly passes out through the outlet 71b, 72b. However, when the inlet 71a, 72a and the outlet 71b, 72b are disposed as described above, the many vibrations having different wavelength can be suppressed.

Further, the first sectioning member 71c, 72c respectively sections the insides of the first and second expansion silencers 71, 72, and the air flows through a space between each first sectioning member 71c, 72c and the inner wall of each silencer 71, 72. The first sectioning members 71c, 72c are disposed so as to cross the propagation path of the air vibration which enters through the inlets 71a, 72a. In this embodiment, the first sectioning members 71c, 72c are disposed perpendicularly to the propagation path. Thus the periodic fluctuation in pressure from the inlet 71a, 72a reflects on the first sectioning member 71c, 72c, and the reflected value and the wave of the vibration are canceled. Accordingly, the periodic fluctuation in pressure transmitted to the discharged dope 51a (see FIGS. 2&3) is suppressed.

Further, as shown in FIG. 8, the first expansion silencer 71 has a first member 75 and a second member 76, which are slidably fitted to each other such that the length L1 may be predetermined value. When the length L1 is set to the predetermined value, the first and second members 75, 76 are fixed by a fixing member 77. Further, in this embodiment, the length L1 of the first expansion silencer 71 is set to satisfy a formula of $V/7f \leq L1 \leq V/2f$. In this formula, V (m/sec.) is a sonic speed in the atmosphere under the casting conditions, f is a frequency at which the peak appears in the graph of a relation between the value |Pv| and the frequency in FIGS. 6A-6B. For example, In FIG. 6B, the frequency value f is 80 Hz, 60 Hx, 40 Hz, 30 Hz or the like. Thus the suppression of the collision-induced vibration and can be made, and therefore the regulation of the periodic fluctuation is made at the specific frequencies to decrease the absolute value |Pv| of the pressure fluctuation Pv. The frequency f is one of the frequencies at which the peaks appear. In the above range of the length L1, there are effects for suppressing vibration of larger frequencies, which are generated in resonance of the vibration of the selected frequency. Accordingly, when the L1 is set as describe above, the expansion silencer can have the same effect as the resonance silencer.

If the length L1 is less than V/7f, a space in the first expansion silencer 71 is too short in the lengthwise direction (or transmitting direction of the vibration) and the effect of the distance delay is small. Otherwise, if the length L1 is more than v/2f, the resonance of the vibration sometimes occurs in a low frequency range, which causes the stronger vibration. The length L1 preferably satisfies a formula of V/5f≦L1≦V/3f. Note that this determination is written as a relation of the length L1 of the first expansion silencer 71, since positions of the inlet and the outlet (of the distance between the inlet and the outlet in the lengthwise direction of the first expansion silencer) are considered. However, the determination is written as a relation of the distance in a propagating direction of the vibration which enters through the inlet. The detailed explanation of the length L1 is made later with use of an illustration of another silencer.

Further, in this embodiment, the second expansion silencer 72 satisfies a formula of V/7f≦L2≦V/2f, and preferably a formula of V/5f≦L2≦V/3f as the length L1. In the present invention the plural (two or more) expansion silencers may be used, and when one of the used silencers (whose length is L) satisfies a formula of V/7f≦L≦V/2f, the above effects are observed. However, it is especially preferable that all of the used silencers satisfy the formula of V/7f≦L≦V/2f, and the periodic fluctuation in pressure of the predetermined frequency is effectively suppressed.

When the plural silencers are used, it is preferable that the length L may be different among them. In this case, the effects of decreasing the absolute value |Pv| at the plural frequencies are obtained. For example, when the length L1 of the first expansion silencer 71 is about 2.1 m, the peak of the value |Pv| (hereinafter |Pv| peak) at f=80 Hz in FIG. 6B can become lower, and when the length L2 of the second expansion silencer 72 is about 1.5 m, the |Pv| peak at f=60 Hz in FIG. 6B can become lower.

When the length L1 of the first expansion silencer 71 and the length L2 of the second expansion silencer 72 satisfy a formula L1=2n×L2 (n is natural numbers), the first expansion silencer 71 suppresses the vibration whose frequency is 2n times as large as the frequency of the vibration suppressed by the second expansion silencer 72. Furthermore, the vibrations generated in the resonance of the second expansion silencer 72 are also suppressed by the first expansion silencer 71. As described above, when the |Pv| peak appear at the plural frequencies, the plural silencers are used and their lengths are respectively determined in accordance with the frequencies of corresponding peaks whose intensity is to be decreased. In this method, only the expansion silencer may be used (without the resonance silencer which is large). In this case, the peaks at several frequencies can be reduced effectively. Further, without using the large resonance silencer, only the expansion silencer is used for suppressing the fluctuations of several frequencies.

In this embodiment, as shown in FIG. 8, a first sectioning member 71c is attached to a slide stage 71d to be slidable in a direction B, and positioned at a predetermined position. A first section D1 and a second section D2 are formed in the first expansion silencer 71 by positioning the first sectioning member 71c, so as to have respective lengths LD1, LD2 in the lengthwise direction of the first expansion silencer 71. In this case, the position of the first sectioning member 71c is determined so as to satisfy at least one of formulae of LD1≦(1/m)×L1, and LD2≦(1/m)×L2. In these formulae, m is natural number of at least two, V (m/sec.) is a sonic speed in the atmosphere under the casting conditions, and f (unit: Hz) is a frequency at which the peak appears in the power spectrum data (as shown in FIGS. 6A-6B) obtained from the pressure fluctuation data by the FFT analysis. The vibration energy at the predetermined frequency is convert into a thermal energy so as to make the decrease of the |Pv| value. In the above range of the length L1, a resonance of the vibration at the selected frequency occurs, which is effective to suppress the other vibrations at larger frequencies.

In the positioning of the first sectioning member 71c, the vibration at the frequency which is (1/m) times as large as the frequency f of the peak whose intensity is to be decreased. For example, the length L1 is set to the predetermined value for suppressing the vibration of the peak at 80 Hz. When at least one of the lengths LD1, LD2 set to have a length of (½)×L1, the intensity of the |Pv| peak at f=40 Hz can become lower. Further, in this embodiment, when the dimension of the first sectioning member 71c is changed, a relation between the effect of decreasing the intensity of the peak at 80 Hz and the effect of decreasing the intensity of the peak at 40 Hz can be adjusted. Concretely, when it is designated to decrease the intensity of the peak at 80 Hz more than at 40 Hz, the dimension of the first sectioning member 71c is made smaller, and when it is designated to decrease the intensity of the peak at 40 Hz more than at 80 Hz, the dimension of the first sectioning member 71c is made larger.

If the expansion silencer whose length L cannot be changed is used, a sectioning member is provided such that the length LD of the section formed by positioning the sectioning member may satisfy a condition of V/7f≦LD≦V/2f. Further, when this method is applied to the above embodiment, it is preferable that the lengths LD1, LD2 respectively satisfy the formulae of $$V/5f \leq LD1 \leq V/3f \text{ and } V/5f \leq LD2 \leq V/3f.$$

In this embodiment, the length which is determined by the sectioning member is set also in the second expansion silencer 72 as in the first expansion silencer 71. For example, the length L2 is set to the predetermined value for damping the vibration of the |Pv| peak at 60 Hz. In this case, when at least one of the lengths LD is set to (½)×L2, the intensity of the |Pv| peak at f=30 Hz can become lower.

When the length LD1 of the first section D1 and the length LS2 of the second section D2 in the first expansion silencer 71 satisfy a formula LD1=2n×LD2 (n is natural numbers), in the first section D1 the vibration is suppressed, whose frequency is 2n times as large as the frequency of the vibration suppressed by the second section D2. In this case, also a vibration generated in resonance in the second section D2 is canceled in the first section D1.

Figure 9:
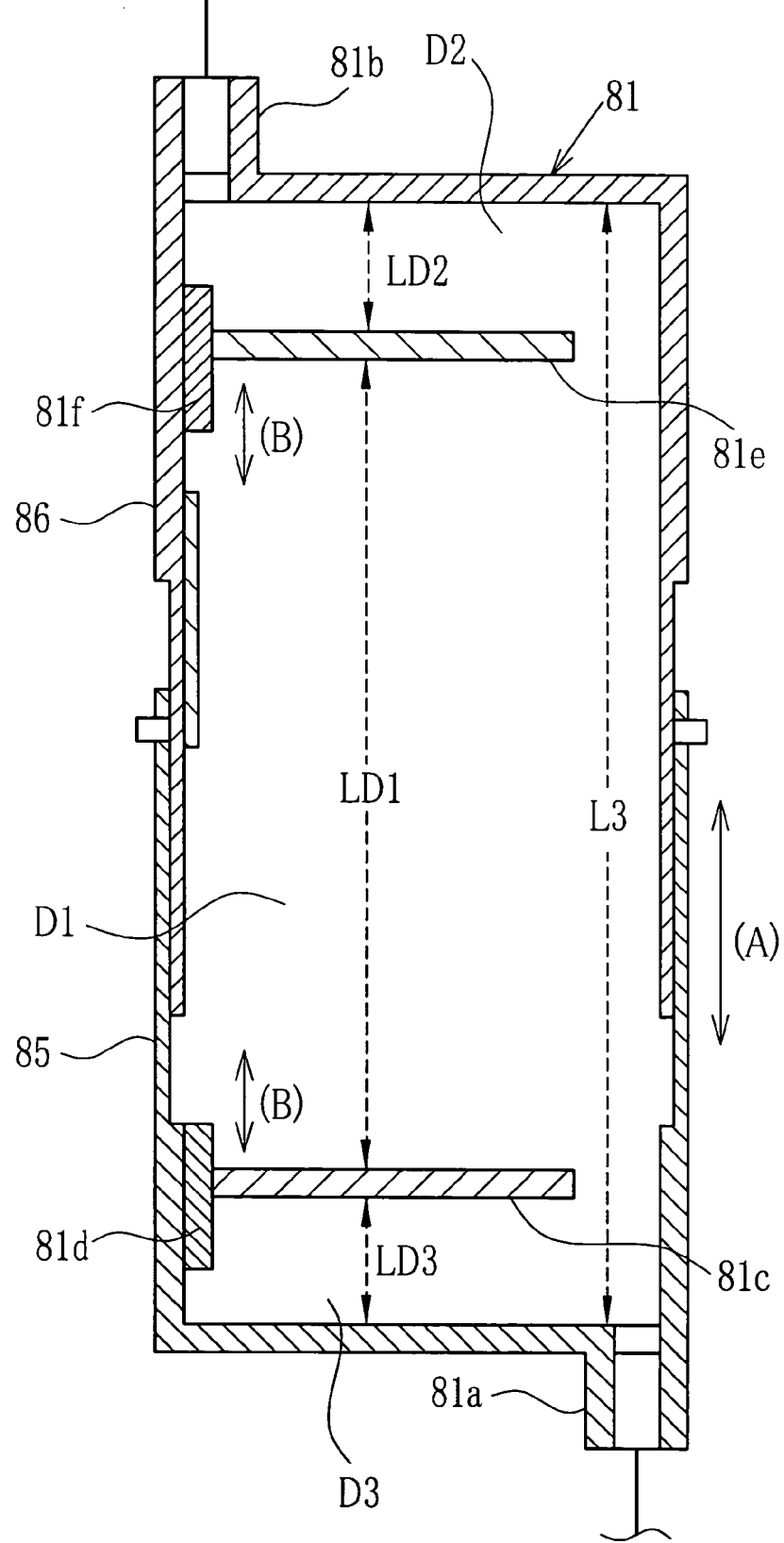

FIG. 9 is a sectional view of a third expansion silencer 81 which is used instead of the first expansion silencer in the above embodiment. The third expansion silencer 81 has a first member 85 and a second member 86 which are slidable in a direction (A), the same as the first and second expansion silencers 71, 72. When the positioning between the first and second members 85, 86 is made, a length L3 is determined. Further, a first sectioning member 81c and a second sectioning member 81e are slidably attached to respective slide stages 81d, 81f. The sectioning members 81c, 81e sections the inside of the third expansion silencer 81 into three sections D1-D3 which have respective three length LD1-LD3 in the lengthwise direction of the third expansion silencer 81. The lengths LD1-LD3 are adjusted to satisfy following formulae, LD1=2n×LD2, LD1=2n×LD3 (n is a natural number).

When the plural peaks of the pressure fluctuation Pv (or |Pv|) appear, the plural sectioning members are provided to form at least three sections for decreasing the intensities of the respective peaks at the corresponding frequencies by determining the length LD of each section.

Figure 10:
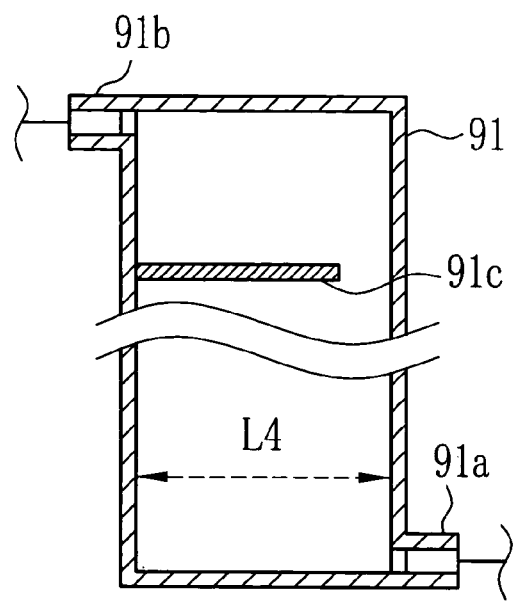
Figure 11:
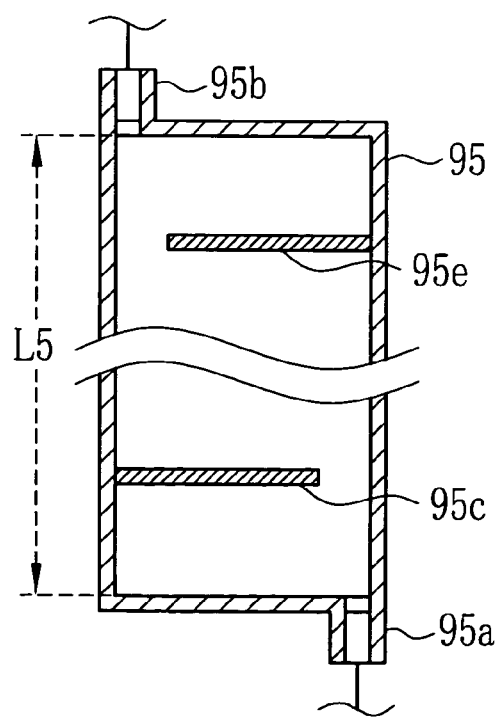

FIGS. 10&11 are sectional views of still other embodiments of the expansion silencers in the present invention, which can be used instead of the first-third expansion silencer. Note that details are omitted in FIGS. 10, 11 for easiness thereof. In FIG. 10, a fourth expansion silencer 91 includes an inlet 91a and an outlet 91b arranged in a direction perpendicular to the lengthwise direction. In this case, a length L4 is not a length in the lengthwise direction, but determined as a length in the propagating direction of the vibration from the inlet 91a, as described above. Further, in FIG. 11, a fifth expansion silencer 95 has an inlet 95a and an outlet 95b at the same positions as the first-third expansion silencers, and a positional relation between the first and second sectioning members 95c, 95e are different from that in the first-third expansion silencers. The first and second sectioning members 95c, 95e section the inner space to form plural sections arranged in the lengthwise direction, but they are attached to opposite walls. Also when the fourth and fifth silencers are used, the same effects as the first-third expansion silencers are obtained.

Note that the degree of pressure reduction in the second decompression chamber 62 or the pipe 67 is preferably in the range of −10 Pa and −2000 Pa from a standard value (zero) thereof to the atmospheric pressure. Especially, when the produced film becomes thinner, the degree of pressure reduction is preferably larger.

The pressure fluctuation and periodic fluctuation in pressure in the second decompression chamber 62 and the pipe 67 can be reduced as described above. In following, the measurement of the pressure fluctuation will be explained. In the measurement of the pressure fluctuation in the second decompression chamber 62, the pressure fluctuation in the second decompression chamber 62 is measured, and from the measured data is calculated by an FFT analysis. Note that the pressure fluctuation in the pipe 67 is regarded as the same as that in the second decompression chamber 62. In this embodiment, Special transducer produced by ST Institute is used as a pressure gauge, and Multi Channel Datastation DS-9110 produced by Ono Sokki Co., Ltd is used for the data analysis of the pressure fluctuation, namely for the FFT analysis. Note that the method of measuring the pressure fluctuation of the present invention is not restricted in the above method, and may be a well-known method of analyzing the pressure fluctuation. According to the present invention, the absolute value |Pv| of the pressure fluctuation is small in all the frequency range, and especially much smaller in the frequency are in the range of 30 to 50 Hz than the prior method. Namely, the effect of the present invention is especially large in this area.

In this embodiment, the effect of reducing the pressure to the discharged dope 51a (see, FIGS. 2&3) is caused by the second decompression chamber. Therefore the periodic fluctuation is reduced only in the second decompression chamber. However, when the reduction of the periodic fluctuation is made also in the first decompression chamber, the effect becomes larger.

For example, in order to regulate the absolute value |Pv| of the pressure fluctuation in the first decompression chamber 61, the inner diameter of the pipe connecting the second decompression chamber and the decompressing fan is in the range of 70 mm to 700 mm, the number of the bend portion of the pipe is at most 15, the length of the pipe is at most 30 m, and the silencer is provided on the pipe, so as to regulate the pressure fluctuation Pv (unit: Pa) in the first decompression chamber 61 at most 1.5|K|. Further, only one decompression chamber is used, the pressure fluctuation is preferably regulated in the used one decompression chamber in the same manner as in the second decompression chamber in this embodiment. As described above, the present invention does not depend on the number of the decompression chambers. However, it is preferable to control the pressure fluctuation in the decompression chamber nearest to the casting film.

In the method of producing the film of the present invention, the polymer component is preferably cellulose acylate, and especially cellulose acetate. Also other polymers and prepolymers thereof than cellulose acylate dissolve to the solvent, and thus the dope to be used for forming the film is obtained. Also in this case the present invention is applied. For example, there are polyvinyl alcohol, denaturated polyvinyl alcohol, polyacrylate esters, polymethacrylate esters, polyethylene telephthalate (PET), polybutylene telephthalate (PBT), chlorinated polyether, polyacetal, polyetherether ketone (PEEK), polyether sulfone (PES), polyimide (PI), polyamide (PA), polyamideimide (PAI), polyphenylen oxide (PPO), polyphenylene sulfone, polysulfone, polyallylate, polycarbonate (PC), polyethylene (PE), polypropylene (PP), polystyrene(PS), polyvinyl chloride (PVC), and the like. Further, the above polymers can be simply used or plural sorts of them are mixed. Further, the solvent of the present invention is not restricted in the solvent of the one solvent material in the embodiments, or may mixture of the plural solvent material. Further, in the present invention, the form and the like of the polymer used for the dope is not restricted in this embodiment, and for example, may be mills, pellets and the like.

In the present invention, the solvent to be used for the dope is not restricted and several sorts of well-known solvents are used, when the film is produced in a solution casting method. As the solvent, there are, for example, organic materials containing alogen, (dichloromethane, dichloroethane and the like), alcohols (methyl alcohol, ethyl alcohol, n-butyl alcohol and the like), ester compounds (methyl acetate, ethyl acetate and the like), non-chloride organic compounds (acetone and the like), and water.

The present invention cannot be applied only to the solution casting method but also to the melt-extrusion method. Namely, when the melt polymer is extruded from a melt-extrusion die to form a film-like material, the decompression is necessary near the extruded film-like material, in order to suppress the vibration of the film-like material. The same conditions as described above are effective also in this case. Note that in the melt-casting, the polymer applied to form a film is cooled under a predetermined cooling condition, instead of the cooling device 15 in the film production equipment in FIG. 1. The natural cooling is sometimes made. During or after the cooling, the film is stretched in a predetermined direction by a stretching device.

Further, in the present invention, the film produced in the above method is used in the polarizing filter. In the polarizing filter of the present invention, the polymer films obtained in the above method are adhered to both surfaces of a polarized film formed of a polyvinylalcohol type film. The polarized film is obtained by dying the polyvinylalcohol type film. As a dying method, there are a gas phase adsorption method and a liquid phase adsorption method. In the present invention, the dying is made in the liquid phase adsorption method.

Iodine is used in the dying method of the liquid phase adsorption. However, the dying method is not restricted in it. The polyvinyl alcohol film is dipped in an iodinie/potassium iodinate (KI) solution for 30 seconds to 5000 seconds. Thereby the iodine concentration in the solution is preferably 0.1 g/litter to 20 g/litter, and the potassium iodine concentration is preferably 1 g/litter to 100 g/litter. Further, the temperature of the solution in the dipping is set to at least 5° C. and at most 50° C.

In the liquid phase adsorption method, a solution of iodine or other dye may be coated or sprayed on the polyvinylalcohol film in a way already known, instead of the above method of dipping the polyvinylalcohol film. The polyvinylalcohol may be colored before or after stretching. However, after being stained, the polyvinylalcohol film adequately swells and is easily tensed. Accordingly, it is preferable that the polyvinylalcohol film is stained before stretching.

Instead of iodine, dichroic dye (including pigments) is preferably used. In the dichroic dyes, there are dye materials of azo type dyes, stilbene type dyes, pyrazolone type dyes, triphenylmethane type dyes, quinoline type dyes, oxadine type dyes, tiadine type dyes, anthraquinone type dyes and the like. Preferably, the dye materials can be dissolved to water. Preferably, a dichroic dye molecule has hydrophilic group, such as sulfonic acid group, amino group, hydroxyl group and the like.

When it is designated that the polyvinylalcohol type film is tensed after coloring, then compounds (or cross-linking agent) for cross-linking polyvinylalcohol is used. Concretely, the polyvinylalcohol type film is dipped into a solution of the cross-linking agent, and otherwise the cross-linking agents are coated or sprayed onto the polyvinylalcohol type film. Thus, the polyvinylalcohol type film is hardened so as to have adequate orientation. Note that the cross-linking agent of polyvinylalcohol type polymer is preferably boric acid based materials, but is not restricted in them.

The films are adhered to the polarized film with the adhesive agent, and the adhesive agent may be already known. Especially preferable are solutions of boron compounds or polyvinylalcohol which contain denatured polyvinylalcohol having acetoacetyl group, sulfonic acid group, carboxyl group, oxyalkylene group and the like. Preferably, the adhesive agent has thickness from 0.01 μm to 10 μm after drying, and particularly from 0.05 μm to 5 μm. Further, an antireflection layer, an antiglare layer, a lubricant layer, an easy adhesive layer and the like are formed on a polyvinyl alcohol layer provided as a protective layer of a polymer film layer.

Further, an optical compensation sheet is applied to the polymer film (especially cellulose triacetate film) obtained in the present invention, so as to use as an optical compensation film. When the antireflection layer is formed on the polarizing filter, the antireflection film is obtained and used as one of two surfaces of the protective films. Thus the liquid crystal display of following types can be obtained: transmissive type, reflective type, or transflective type, such as twisted nematic (TN), super twisted nematic (STN), vertical alignment (VA), in plain switching (IPS), optically compensated bend cell (OCB) and the like. Further, the optical compensation film (such as wide view film for widening the view angle of the liquid crystal display) and the birefringence filter may be combined with the film of the present invention. When the film of the present invention is used in the liquid crystal display of the transmissive type or the transflective type, the brightness enhancement film (film of polarization splitter having a layer of polarization selecting, for example D-BEF produced by Sumitomo 3M Ltd.) in the market is simultaneously used. Thus the produced liquid crystal display has high visibility.

An experiment of the present invention was made, and explanation therefor will be made concretely. However, the present invention is not restricted in the explanation.

EXAMPLE 1

Solid contents in followings were added to a solvent as a mixture of dichloromethane and methanol in 92:8 of weight ratio. This mixture was stationary disposed to remove the bubbles, and thereafter fed to the filtering device 25 by the pump P2. Thus the dope 51 was obtained, and the solid density of the dope 51 was 19.0 wt. %. The dope 51 was cast from the casting die 36. The conveying speed of the belt 38 was 55 m/min. The reduction degree of the second decomposition chamber 62 was controlled during the performance of the casting. The inner diameter of the pipe 67 was 100 mm, and the length was 12 m. The number of the bend portion A was 8. Further, the first expansion silencer was the expansion type and the value S2/S1 thereof was 50. The first expansion silencer 71 and the second expansion silencer 72 have no sectioning members, and have the length L1 of 3.5 m and the length L2 of 2.5 m, respectively. Further, as the fluctuation suppressing device, the resonance silencer 73 was used. The casting film was peeled as the film 52, the film 52 was dried to have a thickness 80 μm. Then the film 52 was wound.

| (Solid Contents) | |
|---|---|
| Cellulose triacetate | 100 pts. wt. |
| Triphenyl phosphate | 7 pts. wt. |
| Biphenyldiphenyl phosphate | 5 pts. wt. |

The casting cope 51 after the filtration was cast from the casting die 36. The conveying speed of the belt 38 was 55 m/minute. The decompression degree of the second decompression chamber 62 was regulated during the casting. the inner diameter of the pipe 67 was 100 mm, and the length thereof was 12 m. The number of the bend portion A was 8. Further, as the ratio S2/S1 was 30 in first expansion silencer 71 and 50 in the second expansion silencer 72. The sectioning member is not provided in the inner space of each first and second expansion silencer 71, 72. The length L1 was 3.5 m and the length L2 was 2.5 m. Further, the resonance silencer 73 was used as the vibration suppressing device. After the peeling of the casting film as the gel-like film, the gel-like film was dried and wound. Thus the film 52 was obtained and the thickness thereof was 80 μm.

The average of the absolute value |Pv| of the pressure fluctuation Pv was calculated according to the predetermined reduction degree of the second decomposition chamber 62 when the percentage of the thickness unevenness generated with periodicity of at least 3 Hz was less than 0.3%, less than 0.8% and at least 1.5%. The results are shown in Table 1, which Examples 1-A, 1-B & 1-C corresponds to the films of these three percentages. The predetermined reduction degree is shown as a difference from the atmospheric pressure. Further, the estimation of the thickness unevenness was made as follows, A (less than 0.3%), B (less than 0.8%), and N (at least 1.5%). Note that the film thickness of the film 52 was measured with FILM THICKNESS TESTER KG601 produced by Anritsu Corp.).

EXAMPLE 2

The thickness of the produced film 52 was 60 µm, and other conditions were the same as Example 1. Thus three films of Examples 2-A, 2-B, 2-C were produced. The results are shown in Table 1.

EXAMPLE 3

The thickness of the produced film 52 was 40 µm, and other conditions were the same as Example 1. Thus three films of Examples 3-A, 3-B & 3-C were produced. The results are shown in Table 1.

TABLE 1

| Example | Predetermined Decompression Degree (Pa) | Thickness Unevenness | $|PV|$ (−) |
|---|---|---|---|
| 1-A | −100 | 1.40 | N |
|  |  | 1.20 | B |
|  |  | 0.80 | B |
|  |  | 0.40 | A |
| 1-B | −300 | 2.40 | N |
|  |  | 1.90 | B |
|  |  | 1.40 | B |
|  |  | 0.60 | A |
| 1-C | −500 | 3.10 | N |
|  |  | 2.80 | B |
|  |  | 2.20 | B |
|  |  | 0.80 | A |
| 2-A | −100 | 1.20 | N |
|  |  | 0.90 | B |
|  |  | 0.70 | B |
|  |  | 0.30 | A |
| 2-B | −300 | 2.10 | N |
|  |  | 1.40 | B |
|  |  | 0.60 | B |
|  |  | 0.30 | A |
| 2-C | −500 | 2.70 | N |
|  |  | 2.30 | B |
|  |  | 1.60 | B |
|  |  | 0.80 | A |
| 3-A | −100 | 1.00 | N |
|  |  | 0.80 | B |
|  |  | 0.60 | B |
|  |  | 0.30 | A |
| 3-B | −300 | 1.70 | N |
|  |  | 1.40 | B |
|  |  | 1.00 | B |
|  |  | 0.40 | A |
| 3-C | −500 | 2.20 | N |
|  |  | 1.80 | B |
|  |  | 1.30 | B |
|  |  | 0.50 | A |

According to Table 1, when Pv was at least $1.5|K|$ (herein $|K|=(t\times|P_0|)^{1/2}100$) the thickness unevenness was almost not observed and the quality of the obtained film was high. When $|Pv|$ was at most $0.5|K|$, the thickness unevenness not observed and the quality of the obtained film was quite high.

EXAMPLE 4

The predetermined decompression degree to the atmospheric pressure in the second decompression chamber 62 was −100 Pa. The inner diameter of the pipe 67 was varied as Examples 4-A, 4-B & 4-C, and an average of the absolute value $|Pv|$ of the pressure fluctuation Pv was calculated as Example 1. The pressure fluctuation was estimated as A when the absolute value $|Pv|$ was at most $0.5|K|$ (herein $|K|=t\times|P_0|)^{1/2}100$), B when the absolute value $|Pv|$ was at most $1.5|K|$, and N when the absolute value $|Pv|$ was more than $1.5|K|$. The results are shown in Table 2.

TABLE 2

| Example | Inner Diameter of Pipe (mm) | $|Pv|$ (−) | Pressure Fluctuation |
|---|---|---|---|
| 4-A | 100 | 0.2 | A |
| 4-B | 80 | 0.8 | B |
| 4-C | 50 | 1.4 | N |

According to Table 2, the pressure fluctuation was too large when the inner diameter of the pipe 67 was 50, and the pressure fluctuation was reduced and good when the inner diameter was 80 mm. Further, the pressure fluctuation was extremely reduced when the inner diameter was 100 mm.

EXAMPLE 5

The predetermined decompression degree to the atmospheric pressure in the second decompression chamber was −100 Pa. The inner diameter of the pipe 67 was 80 mm, and the length of the pipe 67 was 15 m. The number of the bend portion A was varied as in Examples 5-A, 5-B, 5-C & 5-D. An average of the absolute value $|Pv|$ of the pressure fluctuation Pv was calculated as Example 1. The pressure fluctuation was estimated as A when the absolute value $|Pv|$ was at most $0.5|K|$ (herein $|K|=t\times|P_0|)^{1/2}100$), B when the absolute value $|Pv|$ was at most $1.5|K|$, and N when the absolute value $|Pv|$ was more than $1.5|K|$. The results are shown in Table 3.

TABLE 3

| Example | Number of Bend Portion | $|Pv|$ (−) | Pressure Fluctuation |
|---|---|---|---|
| 5-A | 8 | 0.2 | A |
| 5-B | 15 | 0.8 | B |
| 5-C | 20 | 1.4 | N |
| 5-D | 40 | 1.7 | N |

According to Table 3, the pressure fluctuation was too large and not preferable when the number of the bend portion was at least 20, and the pressure fluctuation was reduced and good when the number of the bend portion was 15. Further, the pressure fluctuation was extremely reduced when the number of the bend portion was 8.

EXAMPLE 6

The predetermined decompression degree to the atmospheric pressure in the second decompression chamber 62 was −100 Pa. The inner diameter of the pipe 67 was 80 mm, and the number of the bend portion was 10. The length of the pipe 67 was varied as in Examples 6-A, 6-B & 6-C. An average of the absolute value $|Pv|$ of the pressure fluctuation Pv was calculated as Example 1. The pressure fluctuation was estimated as A when the absolute value $|Pv|$ was at most $0.5|K|$ (herein $|K|=t\times|P_0|)^{1/2}100$), B when the absolute value $|Pv|$ was at most $1.5|K|$, and N when the absolute value $|Pv|$ was more than $1.5|K|$. The results are shown in Table 4.

TABLE 4

| Example | Length of Pipe (m) | \|Pv\| (—) | Pressure Fluctuation |
|---|---|---|---|
| 6-A | 10 | 0.3 | A |
| 6-B | 25 | 0.8 | B |
| 6-C | 50 | 1.5 | N |

According to Table 4, the pressure fluctuation was too large and not preferable when the length of the pipe 67 was 50 m, and the pressure fluctuation was reduced and good when the length of the pipe 67 was 25 m. Further, the pressure fluctuation was extremely reduced when the length of the pipe 67 was 10 m.

EXAMPLE 7

The predetermined decompression degree to the atmospheric pressure in the second decompression chamber was −100 Pa. The inner diameter of the pipe 67 was 80 mm, the length of the pipe 67 was 15 m, and the number of the bend portion was 15. The numbers of the silencers of both expansion silencer and resonance silencer was varied as in Examples 7-A, 7-B, 7-C, 7-D & 7-E. An average of the absolute value |Pv| of the pressure fluctuation Pv was calculated as Example 1. When both expansion silencer and resonance silencer were used at the same time, the former type was positioned upstream from the latter type, independent of the number thereof. The pressure fluctuation was estimated as A when the absolute value |Pv| was at most 0.5|K| (herein $|K|=t\times|P_0|)^{1/2}100$), B when the absolute value |Pv| was at most 1.5|K|, and N when the absolute value |Pv| was more than 1.5|K|. The results are shown in Table 5.

TABLE 5

| | Number of Silencer | | | |
|---|---|---|---|---|
| Example | Expansion silencer | Resonance silencer | \|Pv\| (—) | Pressure Fluctuation |
| 7-A | 3 | 1 | 0.1 | A |
| 7-B | 1 | 1 | 0.8 | B |
| 7-C | 0 | 1 | 1.5 | N |
| 7-D | 1 | 4 | 0.3 | A |
| 7-E | 1 | 0 | 1.4 | N |

According to Table 5, the pressure fluctuation was too large and not preferable when the silencer of the expansion silencer was not used, and the pressure fluctuation was reduced and good when the number of the silencer of the expansion silencer was one. Further, the pressure fluctuation was extremely reduced when the number of the silencer of the expansion silencer was three.

EXAMPLE 8

The predetermined decompression degree to the atmospheric pressure in the second decompression chamber 62 was −100 Pa. The inner diameter of the pipe 67 was 80 mm, the length of the pipe 67 was 15 m, and the number of the bend portion a was 10. The value S2/S1, as a ratio of a sectional dimension of the first expansion silencer 71 of expansion silencer to a sectional dimension S1 of the pipe 67, was varied as in Examples 8-A, 8-B & 8-C. An average of the absolute value |Pv| of the pressure fluctuation Pv was calculated as Example 1. When both expansion silencer and resonance silencer were used at the same time, the former type was positioned upstream from the latter type, independent of the number thereof. The pressure fluctuation was estimated as A when the absolute value |Pv| was at most 0.5|K| (herein $|K|=t\times|P_0|)^{1/2}100$), B when the absolute value |Pv| was at most 1.5|K|, and N when the absolute value |Pv| was more than 1.5|K|. The results are shown in Table 6.

TABLE 6

| Example | Value of Ratio S2/S1 | \|Pv\| (—) | Pressure Fluctuation |
|---|---|---|---|
| 8-A | 22 | 0.3 | A |
| 8-B | 6 | 0.8 | B |
| 8-C | 2 | 1.4 | N |

According to Table 6, the pressure fluctuation was too large and not preferable when the value S2/S1 was 2, and the pressure fluctuation was reduced and good when value S2/S1 was 6. Further, the pressure fluctuation was extremely reduced when value S2/S1 was 22.

EXAMPLE 9

The decompression degree in the second decompression chamber 62 was −200 Pa the same as in Example 1-B. The inner pressure in the second decompression chamber 62 was measured and the obtained data was processed in the FFT analysis to an analysis data of the periodic fluctuation which periodically appears. In this analysis data, the peak of the absolute value |Pv| was formed at f=80 Hz, and the maximal of the peak was 1.9. Thereby the length L1 of the first expansion silencer 71 was changed from 3.5 m to the predetermined values in each Examples 9-A to 9-E in Table 7. When the length L1 was set to the predetermined value, the peak intensity of the absolute value |Pv| at 80 Hz was obtained. Note that the estimation was E (excellent) when the peak intensity at 80 Hz was 0 to 0.25, G (good) when the peak intensity was 0.25 to 1.0, and B (bad) when the peak intensity was more than 1.0.

TABLE 7

| | Length L1 (m) | \|Pv\| [at 80 Hz] | Estimation |
|---|---|---|---|
| Ex. 9-A | 2.1 | 0.2 | E |
| Ex. 9-B | 1.3 | 0.8 | G |
| Ex. 9-C | 3.5 | 0.7 | G |
| Ex. 9-D | 5.0 | 1.8 | B |
| Ex. 9-E | 1.0 | 1.5 | B |

According to Example 9, the effect of reducing the peak of the absolute value |Pv| at 80 Hz becomes different in accordance with the change of the length L1 of the first expansion silencer 71. In order to reduce the |Pv| peak, the Table 7 teaches that it is effective to adjust the length L1 to the predetermined value in a range of at least V/7f and at most V/2f, in accordance with the frequencies at which the peaks appeared.

EXAMPLE 10

Without setting the predetermined decompression degree to −100 Pa, an analysis data of the periodic fluctuation in the second decompression chamber 62 was obtained. In this analysis data, the peak of the absolute value |Pv| was shown at f=60 Hz, and the maximal of the peak was 2.1. Thereby the length L1 of the first expansion silencer 71 was changed from 3.5 m in Example 9 to the predetermined values in each Examples 10-A to 10-E in Table 8. When the length L1 was set to the predetermined value, the peak intensity of the absolute value |Pv| at 60 Hz was measured.

TABLE 8

|  | Length L1 (m) | \|Pv\| [at 60 Hz] | Estimation |
| --- | --- | --- | --- |
| Ex. 10-A | 1.50 | 0.2 | E |
| Ex. 10-B | 1.10 | 0.8 | G |
| Ex. 10-C | 2.50 | 0.6 | G |
| Ex. 10-D | 3.15 | 1.9 | B |
| Ex. 10-E | 0.60 | 1.4 | B |

According to Example 10, the effect of reducing the peak of the absolute value |Pv| at 60 Hz becomes different in accordance with the change of the length L1 of the first expansion silencer 71. In order to reduce the |Pv| peak, the Table 8 teaches that it is effective to adjust the length L1 to the predetermined value in a range of at least V/7f and at most V/2f, in accordance with the frequencies at which the peaks appeared.

EXAMPLE 11 the first expansion silencer 71 was provided with the sectional members, whose number was determined in Examples 11-A to 11-D and is shown in Table 9. Other conditions of Examples 11-A to 11-D are the same as Example 9-1. In this examination, the peak intensity of the |Pv| peak at 80 Hz was measured, and the result thereof is shown in Table 9. The estimation was made the same as in Tables 7 and 8.

TABLE 9

|  | Number of Sectioning Member | \|Pv\| [at 80 Hz] | Estimation |
| --- | --- | --- | --- |
| Ex. 11-A | 0 | 0.8 | B |
| Ex. 11-B | 1 | 0.2 | G |
| Ex. 11-C | 2 | 0.2 | G |
| Ex. 11-D | 3 | 0.1 | E |

In Example 11, when the length L1 was set to a predetermined value, the peak at 80 Hz became smaller, and when the sectioning member was provided, the intensity of the peaks at 40 Hz and the like became smaller. Accordingly, the number of the sectioning member in the first expansion silencer 71 changed, the effect of reducing not only the peak at 80 Hz but also the peaks at 40 Hz (frequency was half of 80 Hz) and the like changed.

EXAMPLE 12 in Example 12-A, the first expansion silencer 71 was used. In Example 12-B, a expansion silencer in which the extended centerline through the inlet enters into the outlet was used instead of the first expansion silencer 71. Other conditions of Examples 12-A to 12-D were the same as Example 9-1. In this examination, the peak intensity of the |Pv| peak at 80 Hz was measured, and the result thereof is shown in Table 10. The estimation was made the same as in Tables 7 to 9.

TABLE 10

|  | \|Pv\| [at 80 Hz] | Estimation |
| --- | --- | --- |
| Ex. 12-A | 0.2 | G |
| Ex. 12-B | 0.8 | B |

In Example 12, the different positional relation between the inlet and the outlet changes the effect of suppressing the vibration. When the extended centerline of the inlet did not enter the outlet, the effect of suppressing the vibration became higher.

EXAMPLE 13

The antireflection film having antiglare properties were dipped in 2.0 N—NaOH at 55° C. for 2 minutes. Thus a cellulose triacetate surface as one surface of the antireflection film was saponified. Further, the cellulose triacetate film obtained in Example 1-C was saponified under the same condition. These two films were adhered as protective films to respective surfaces of a polarizer while iodine was adsorbed to a polyvinyl alcohol to obtain the polarizer. Thus a polarizing filter was obtained, and the quality thereof was high since it was excellent in flatness.

EXAMPLE 14

A polarizeing filter in a viewer's side of a TN liquid crystal display of transparent type (hereinafter LCD) provided with a notebook type personal computer was exchanged to the polarizing filter obtained Example 13, while a D-BEF (produced by Sumitomo 3M) as a polarization separation film having polarization optional layer was provided between a back light and a liquid crystal cell in the LCD.

Various changes and modifications are possible in the present invention and maybe understood to be within the present invention.

What is claimed is:

1. A method of producing a film from a dope containing a polymer or a molten polymer, said dope or said molten polymer being discharged from a die onto a running support and peeled as said film from said support, said film being dried or cooled to have a predetermined thickness t (μm), said method comprising steps of:

decompressing by a decompressing apparatus in upstream side of said running support from said dope or said molten polymer that is discharged from said die; and wherein when a predetermined value to the decompression is $P_0$ (unit; Pa) and the different between said predetermined value $P_0$ and a measured value after the decompression is a pressure fluctuation Pv, said pressure fluctuation Pv satisfies following formula, $$|Pv| \leq 1.5|K| (K=(t \times |P_0|)^{1/2}/100)$$

wherein said decompressing apparatus includes a decompression chamber, a decompression regulating section for regulating an inner pressure of said decompression chamber, and a pipe connecting said decompression chamber and said decompression regulating section; and wherein said pipe is provided with a vibration damping device for damping a vibration which causes the change of said inner pressure.

2. The method as defined in claim 1, wherein an inner diameter of a pipe connecting to said decompression chamber is in the range of 70mm to 700mm.

3. The method as defined in claim 1, wherein said vibration damping device is an expansion silencer or a resonance silencer.

4. The method as defined in claim 3, wherein said expansion silencer or said resonance silencer are used simultaneously.

5. The method as defined in claim 4, wherein when a sectional dimension of an inner space in said pipe is Si and a sectional dimension of an empty area in a lengthwise direction of said expansion silencer is S2, a value S2/S1 is from 5 to 500.

6. A method of producing a film from a polymer, said polymer being applied onto a running support with use of a die and peeled as said film from said support, said film being dried or cooled, said method comprising steps of:
 discharging from said die said polymer in a situation which said polymer is dissolved to a solvent or melt;
 decompressing near said discharged polymer by a decompressing apparatus;
 damping by a silencer of said decompressing apparatus a vibration occurring during a drive of said decompressing apparatus, such that a pressure near said polymer may be suppressed in a predetermined fluctuation range during the decompression.

7. The method as defined in claim 6, wherein said silencer is an expansion silencer.

8. The method as defined in claim 7, further comprising steps of:
 measuring said pressure periodically fluctuated by said vibration;
 performing by a PET program a frequency decomposition of a measured data obtained in the measurement;
 satisfying a length L of said expansion silencer in a lengthwise direction with a formula of $V/7f \leq L \leq V/2f$
 wherein f (Hz) is a frequency at a pressure whose value is larger than a predetermined value in a data which is obtained by the frequency decomposition, and V (in/sec.) is a sonic speed in the atmosphere.

* * * * *